United States Patent Office 3,384,450
Patented May 21, 1968

3,384,450
METHOD FOR SYNTHESIZING CUPROUS IODIDE FROM A CUPRIC SALT
Donald J. Trevoy, John W. Henson, and Arthur A. Rasch, Rochester, N.Y., assignors to Eastman Kodak Company, Rochester, N.Y., a corporation of New Jersey
No Drawing. Filed Feb. 7, 1966, Ser. No. 525,370
5 Claims. (Cl. 23—97)

ABSTRACT OF THE DISCLOSURE

Cuprous iodide of high purity is prepared by reacting a cupric salt with an alkali metal sulfite and an alkali metal iodide in an aqueous medium which is maintained at a pH of from about 5 to about 7 during the reaction. Contamination from free iodine is avoided, and high yields are obtained due to the prevention of undesired side reactions.

---

This invention pertains to the synthesis of cuprous iodide and more particularly to a method for obtaining substantially pure cuprous iodide uncontaminated by free iodine.

Previous schemes which have proposed synthesizing cuprous iodide free of iodine contamination have been demonstrated to fall short of that goal. The reaction:

(1) $2CuSO_4 + 4KI + 2Na_2S_2O_3 \rightarrow 2CuI + 2\ K_2SO_4 + Na_2S_4O_6 + 2NaI$ utilized an excess of sodium thiosulfate. The function of this excess is to selectively and quantitatively react with the free iodine formed during the metathesis of cuprous iodide. The reaction (1) produces cuprous iodide with the free iodine producing sodium iodide as a result of its immediate reaction with the excess sodium thiosulfate. Quantitatively, however, the desired stoichiometric relationships necessary for the prevention of the formation of free iodine can be present only at the end point of the reaction. During the reaction, the formation of sodium iodide initiates a side reaction with cupric sulfate thereby producing additional cuprous iodide and free iodine. Within the framework of this reaction mechanism therefore, free iodine is in contact with the cuprous iodide formed during essentially the entire course of the reaction. This contact is sufficient to contaminate the cuprous iodide with free iodine.

It is highly advantageous in various fields for example photographic applications and the like, to have a source of substantially pure cuprous iodide. It is particularly important that contact between free iodine and cuprous iodide is avoided during any proposed synthesis due to the undesirable coloring that iodine contamination imparts to the compound. Trace amounts of iodine may severely limit subsequent chemical or photochemical uses for the compound. As described above, previous methods of directly synthesizing an uncontaminated product have met with little success and commercially obtainable cuprous iodide has to be purified prior to use. This is costly and undesirable and tends to limit broad commercial utilization of the compound.

It is, therefore, an object of this invention to provide a novel method for producing cuprous iodide which is characterized by its lack of contamination by free iodine during its formation.

Other objects and advantages resulting from the practice of the method of the present invention will be apparent from the following description.

It has been discovered that cuprous iodide which is free of the undesirable iodine contamination may be prepared by reacting together in an aqueous medium or solution essentially stoichiometric quantities of cupric ions and iodide ions in the presence of a quantity of sulfite ions sufficient for reducing all of the cupric ions to cuprous ions. The desired elimination of free iodine formation during the reaction is thereby achieved. In addition undesirable side reactions prevented and nearly theoretical quantities of product are obtained if the reaction environment is maintained in a range of pH values from about 5 to about 7 during the entire course of the reaction.

The following description of the mechanism proposed for the novel synthesis of iodine free cuprous iodide is intended to be explanatory only and not be construed as limiting the invention to the particular reactants employed. It is of course apparent that various water soluble cupric salts may be substituted for the disclosed sulfate, such as for example cupric nitrate, chlorate and the like. Similarly, cations of other alkali metals may likewise be substituted for the cation in the potassium and sodium salts of the iodine and the sulfite respectively. Likewise, many known buffering agents or combinations of acids and bases which are compatible with the reactants and the reaction environment may be utilized in the method of this invention.

Typically, the over-all reaction of the invention may be characterized as follows:

(2) $2CuSO_4 + 2KI + Na_2SO_3 + H_2O \rightarrow 2CuI + K_2SO_4 + 2NaHSO_4$

During reaction (2), however, the following intermediate stages are felt to exist.

(3) $2CuSO_4 + Na_2SO_3 + H_2O \rightarrow Cu_2SO_4 + 2NaHSO_4$

This reduction of the cupric sulfate avoids the formation of a compound capable of causing reduction of additional cupric sulfate thereby avoiding one source of free iodine formation unavoidable in the previous scheme shown by reaction (1). Reaction (3) may be considered to be followed by reaction (4).

(4) $Cu_2SO_4 + 2KI \rightarrow 2CuI + K_2SO_4$

In this manner no free iodine is formed during the course of the reaction which could contaminate the cuprose iodide product.

The use of sodium sulfite in reaction (2) not only prevents the formation of free iodine but also avoids the inconvenience in synthesis presented by the formation of colloidal sulfur occasioned by the decomposition of the sodium thiosulfate in reaction (1).

The preferred procedure for practice of the novel method according to this invention requires careful control of the pH of the reaction medium during the course of the synthesis. As will be further apparent from the example given hereinafter, a substantial excess of the sodium sulfite is employed in one of the reactant solutions. The sodium sulfite, which is alkaline, tends to react with the sodium bisulfate, which is acidic. If the pH of the reaction mixture reaches a value greater than about 7 cuprous hydroxide may precipitate. This will contaminate the cuprous iodide product and lower the over-all percentage yield of the synthesis. Likewise pH values below about 5 are undesirable due to the possibility of decomposition of the sulfite to produce sulfur dioxide thereby upsetting the reaction mechanism. These problems are easily avoided, particularly using the standard double jet apparatus for precipitation, by introducing the reactant solutions separately at equivalent rates into a buffered starting solution. It is preferred to introduce a capric sulfate solution against a reducing solution containing a slight excess over the stoichiometric amount of potassium iodide together with an excess of sodium sulfite and sufficient sodium hydroxide to neutralize substantially all of the acidic ions produced in the reaction. In this manner, the pH will be automatically maintained at a value from about 5.7 to about 7. The buffering achieved during the reaction by the sulfite-bisulfite competition can be characterized by the following reactions.

(5) $NaHSO_4 + NaOH \rightarrow Na_2SO_4 + H_2O$ (6) $NaHSO_4 + Na_2SO_3 \rightarrow Na_2SO_4 + NaHSO_3$ Likewise, assuming that the ionization of $HSO_3^-$ yields reversibly $H^+$ and $SO_3^=$ it is within the capability of one skilled in the art to select suitable amounts of sulfuric acid in the reaction vessel and excess sodium sulfite in the reducing solution to insure a sufficient buffer capacity and therefore a proper pH control throughout the addition of the cupric sulfate and reducing solutions.

The following example represents a preferred embodiment of the method of the invention previously described herein.

Example

A 500 ml. solution of cupric sulfate was prepared by dissolivng 84.05 gm. of the penta hydrate in distilled water. A reducing solution (500 ml.) was prepared comprising 57.02 gm. of potassium oidide, 36.7 gm. of sodium sulfite and 6.77 gm. of sodium hydroxide dissolved in distilled water. Stoichiometrically a slight excess of the iodide was used ensuring complete conversion of all of the cupric sulfate. Both solutions were separately filtered and placed in separate dropping flasks each maintained at room temperature and equipped with needle valve stopcocks and capillaries leading therefrom directed into a reaction vessel having a magnetic stirrer. The length and diameter of the capillaries were chosen such that flow control of the two solutions into the reaction vessel would be due primarily to the pressure drop in the capillaries rather than depending on the stopcocks for control. The starting solution placed in the reaction vessel prior to introduction of the reactants comprised 63.5 ml. of 1 N sulfuric acid in 78.5 ml. of distilled water stirred together with 10 gm. of sodium sulfite dissolved in 50 ml. of distilled water. In order to initiate the reaction, the flow of reducing solution into the reaction vessel is started first, with rapid stirring. After a suitable interval of time the addition of the cupric sulfate solution is started at an equal rate. During the reaction, a pale green color may be noted in the reaction vessel but not the violet characteristic of free iodine. After completion of the reaction, the pH should have a value of about 6.5 and the supernatant liquid over the white precipitate should be essentially clear and colorless. After settling and decanting the reaction mixture, the precipitate was washed with distilled water and dried. This method of producing iodine free cuprous iodide yielded 63.9 gm. or 98.2% of the theoretical yield for the amount of reactants. It is also interesting to note that the particle size of the cuprous iodide product synthesized by the method of this invention when the dropping flasks were equipped with 1.0 mm. ID capillaries was in a narrow range of from about 0.5 microns to about 2.0 microns as detemined by electron microscopy.

Although this invention has been described with reference to a preferred specific example thereof, it is readily apparent that the disclosed method for synthesizing cuprous iodide uncontaminated by free iodine is broader than the specific materials and amounts of materials disclosed and may be practiced with a wide variety of water soluble cupric, iodide and sulfite salts, and is not to be limited to any particular apparatus for its practice. It will be understood therefore that variations and modifications can be effected within the spirit and scope of the invention as described hereinabove and as defined in the appended claims.

We claim:

1. A method of synthesizing cuprous iodide without the formation of cuprous hydroxide, sulfur dioxide and iodine during said synthesis, which method comprises the steps of reacting, in a medium having a pH of from about 5 to about 7, (1) a first aqueous solution of cupric ions together with (2) a second aqueous solution containing both a quantity of sulfite ions at least sufficient for reducing all of the cupric ions to cuprous ions and a substantially stoichiometric quantity of iodide ions, wherein the sulfite ions are supplied by an alkali metal sulfite and the iodide ions are supplied by an alkali metal iodide.

2. The method according to claim 1 wherein the second solution additionally contains basic ions in sufficient quantity to maintain the reaction medium at a pH of about 5 to about 7 during the reaction.

3. A method for obtaining iodine-free cuprous iodide comprising the reaction step of mixing together an aqueous solution comprising cupric sulfate and an aqueous reducing solution comprising an amount of an alkali metal sulfite sufficient to reduce all of the cupric sulfate to cuprous sulfate and an amount of an alkali metal iodide sufficient to react completely with the cuprous sulfate to form cuprous iodide, wherein the reaction mixture is maintained at a pH of from about 5 to about 7 during the reaction.

4. The method according to claim 3 wherein the aqueous reducing solution additionally contains basic ions in sufficient quantity to neutralize bisulfate ions produced by the reaction between the cupric sulfate and the alkali metal sulfite, thereby preventing the production of sulfur dioxide during the reaction.

5. The method according to claim 3 wherein the reaction mixture is buffered to maintain a pH value in the range of from about 5 to about 7.

References Cited

UNITED STATES PATENTS

| | | | |
|---|---|---|---|
| 101,011 | 3/1870 | Hatschek | 23—166 |
| 311,595 | 2/1885 | McDougall | 23—166 |
| 2,357,990 | 9/1944 | Amenabar | 23—97 XR |

OTHER REFERENCES

Anal. Chem., vol. 25, No. 7, July 1953, pp. 1113, 1114. Copy in 23/97 literature.

OSCAR R. VERTIZ, *Primary Examiner.*

EDWARD STERN, *Examiner.*